United States Patent
Rykhlinkskaya et al.

(10) Patent No.: US 8,762,062 B2
(45) Date of Patent: Jun. 24, 2014

(54) METHOD FOR MARINE GEOELECTRICAL EXPLORATION WITH ELECTRICAL CURRENT FOCUSING

(76) Inventors: Ekaterina Rykhlinkskaya, Heidelberg (DE); Sofia Davydycheva, Sugar Land, TX (US)

( * ) Notice: Subject to any disclaimer, the term of this patent is extended or adjusted under 35 U.S.C. 154(b) by 250 days.

(21) Appl. No.: 13/133,973

(22) PCT Filed: Mar. 25, 2009

(86) PCT No.: PCT/RU2009/000139
§ 371 (c)(1),
(2), (4) Date: Jun. 10, 2011

(87) PCT Pub. No.: WO2010/074593
PCT Pub. Date: Jul. 1, 2010

(65) Prior Publication Data
US 2011/0320125 A1     Dec. 29, 2011

(30) Foreign Application Priority Data
Dec. 22, 2008 (RU) .................................. 2008150604

(51) Int. Cl.
*G01V 3/38* (2006.01)

(52) U.S. Cl.
USPC .................................................. 702/5; 702/2

(58) Field of Classification Search
USPC ........................................................ 702/5, 2
See application file for complete search history.

(56) References Cited

U.S. PATENT DOCUMENTS

| | | | |
|---|---|---|---|
| 4,617,518 A | 10/1986 | Srnka | |
| 5,563,513 A * | 10/1996 | Tasci et al. | 324/359 |
| 7,126,338 B2 | 10/2006 | MacGregor et al. | |
| 7,203,599 B1 * | 4/2007 | Strack et al. | 702/2 |
| 7,737,699 B2 | 6/2010 | Rykhlinski et al. | |
| 7,788,049 B2 * | 8/2010 | Bryant et al. | 702/57 |
| 2008/0189042 A1 * | 8/2008 | Lisitsyn et al. | 702/11 |
| 2009/0219029 A1 * | 9/2009 | Barsukov et al. | 324/334 |

FOREIGN PATENT DOCUMENTS

| | | | | |
|---|---|---|---|---|
| EP | 1876473 A1 * | 1/2008 | | G01V 3/12 |
| EP | 1887386 A1 * | 2/2008 | | G01V 3/06 |

OTHER PUBLICATIONS

S.E. Johansen et al., Subsurface hydrocarbons detected by electromagnetic sounding. Technical article, Fast Break, vol. 23, Mar. 2005.
H.G. Doll, The Laterolog: A new resistivity logging method with electrodes using an automatic focusing system. Journal paper, 2-1:2-12, Petroleum Transactions, Society of Petroleum Engineers. v. 192; pp. 305-316.
W.H. Pelton, Mineral Discrimination and Removal of Inductive Coupling with Multifrequency IP. Journal Article, Geophysics, vol. 43, No. 3 (Apr. 1978) pp. 588-609.

* cited by examiner

*Primary Examiner* — John Breene
*Assistant Examiner* — Stephanie Bloss
(74) *Attorney, Agent, or Firm* — Ira M. Turner

(57) ABSTRACT

Methods and apparatus for marine geoelectrical exploration use a dipole source, to send electric pulses into the medium. Geometrical probing is performed during current pulses, and probing on transient processes is performed in the intervals. Measurements are taken using measuring apparatus mounted on the seafloor. The apparatus includes, five electrodes: a central electrode with four others around it. During the current flow period and intervals between current pulses, the second electric potential difference between external electrodes and the central electrode, as well as the first electric potential difference between three pairs of external electrodes is measured. Measured values are used to calculate three sets of standard electrical parameters. A model of the medium is produced from the parameters. Techniques disclosed provide for elimination of lateral effect on probing results, and delineation of hydrocarbon accumulation with high contrast.

19 Claims, 3 Drawing Sheets

METHOD FOR MARINE GEOELECTRICAL EXPLORATION WITH ELECTRICAL CURRENT FOCUSING

The invention relates to the field of geophysical exploration and more particularly to marine geoelectrical exploration methods using artificial controlled sources of electromagnetic field. It is designed to explore and delineate hydrocarbon (HC) accumulations in the continental shelf based on the focusing of electrical current and separate identification and mapping of essential for achieving our goal three electrophysical parameters inherent to each element (horizon) of sedimentary rocks and characterized by anomalous values in the zones of HC accumulations: electrical conductivity, induced polarization and time decay constant of the induced polarization. Together these three electro-physical parameters make it possible to distinguish HC reservoirs from surrounding host rock.

Geoelectrical exploration methods, including marine exploration, with controlled excitation of the surveyed medium by electrical current are well known (DC and AC resistivity methods, including transient processes, based on axial dipole setup ABMN). However, they are designed to determine only one out of three electro-physical parameters listed above, i.e. apparent resistivity, and not for the specific desirable section of surveyed space, but for the entire space penetrated by the source electrical current spreading according to the diffusion law. This is far from adequate for prospecting and delineation of HC accumulations available nowadays for geological exploration, which occur at the depths over 1000 m below the seafloor.

Note that according to the theory and practice of geoelectrical exploration based on axial dipole setup ABMN, it is possible to identify (but not delineate) high-contrast HC reservoirs (with thickness of at least 50-100 m and electrical resistivity of at least 50 fold greater than resistivity of surrounding rock) at the depths in the range of 1000 m. However, such reservoirs are rare and for the most part have been already explored by now.

In the past 90 years, there were numerous attempts in one form or another to perform the sounding based on axial dipole setup ABMN with controlled current excitation for exploration of HC accumulations, but due to their low efficiency for HC exploration they did not find broad applications. Electrical dipole sounding has high resolution at depths of up to 500 m, and is successfully implemented in prospecting for underground water and ore reservoirs, as well as in engineering surveys and archeology.

Based on the results of axial dipole ABMN setup sounding with controlled current excitation, apparent resistivity $\rho$ can be calculated using the universal formula $$\rho = K \cdot \Delta U / I, \qquad (1)$$

where

I—measured surge of electric current in electrical dipole source;

$\Delta U$—measured potential difference at the ends of receiving electrodes MN;

K—geometric factor of a sounding device. (A. G. Tarkhov, Editor, "Electrical Prospecting, Geophysicist's Manual", M., Nedra, 1980, p. 237 and pp. 422-406) [1].

Since electric current is propagating in the surveyed medium according to the diffusion law, this approach, commonly utilized in all traditional methods of determining electrical resistivity in geoelectrical surveys with controlled current source, yields only aggregate information about all structural elements of the medium, in which electric field is developing, because spatial distribution of the source electric current I is not controlled by any means, and there is no information about this distribution in the actual three-dimensional inhomogeneous media.

One of the resistivity methods used in marine geoelectrical surveys is seabed geometrical sounding with low-frequency AC axial dipole setup ABMN called <<sea bed logging (SBL)>> by the Norwegian company EMGS (S. E. Johansen, H. E. F. Amundsen, T. Rosten, S. Ellingsrud, T. Eidesmo and A. H. Bhuyian, "Subsurface hydrocarbons detected by electromagnetic sounding", First Break, Vol. 23, March 2005, 31-36 [2].) This method is also known as "controlled source electromagnetic sounding (CSEM)," or "offshore hydrocarbons mapping (OHM)."

Seafloor profiling using SBL with offset of 6.5 km between AB and MN over the Troll West Gas Province (TWGP), one of the largest offshore gas fields in the world, is described in [2]. The field is located at a depth of 1070 to 1023 m below seafloor and extends along a profile of 10.5 to 17.5 km (average water depth is 330 m). It is characterized by anomalously high electrical resistivity (250-1000 Ohmm) compared to the resistivity of the host rocks (1-2 Ohmm) and a large thickness of 160 m. (Note that a predominant majority of HC reservoirs have electrical resistivity varying by 5 to 30 times from the resistivity of the peripheral rocks, and their thicknesses vary from a few meters to a few tens of meters.)

Nevertheless, as it follows from the description [2] and attached figures thereto, SBL profiling curve already gets distorted by the influence of this geometrically large and high-contrast in resistivity field, when measuring device approaches 6 km from the source. The four structures located to the right of the field between 17.5 and 24 km get suppressed by the lateral influence of the field, so the problem of determining HC presence or absence in these structures does not have a solution. Delineation of reservoir outline boundaries is out of question here, since a transition from peripheral zone to the main reservoir on resistivity curve (the actually measured curve and a theoretical one) extends to more than 3 km. This information is very poor for an HC reservoir with so vivid electrical and geophysical parameters. Besides, in shallow water, CSEM (OHM, SBL) method does not provide even such scant information about HC reservoirs.

Thus, resistivity methods, including geometrical sounding without focusing of electric current, are of little avail for prospecting and delineation of the majority of HC reservoirs occurring in the geological formations at depths over 1000 m below seafloor at least for three reasons: first, only one (apparent resistivity) out of three electro-physical parameters needed for these purposes is registered, which is far from being always sufficient for identification of hydrocarbon accumulations in geological formations; second, the registered parameter (apparent resistivity) is too rough for said purpose since due to the lack of vertical focusing of electric current, registered is the aggregate resistivity of all geological subjects present in the surveyed medium, in which the electric field of the current source is developed, which means that the measurement results are significantly distorted by the influence of lateral geological inhomogeneities; third, induced polarization parameter $\eta$, which alongside with electrical resistivity also has anomalous value in the zone of HC accumulations, is not registered.

In geoelectrics, the influence of lateral geological inhomogeneities is called lateral influence. In prospecting for hydrocarbon accumulations occurring at depths over one kilometer it affects measurement results as far as several kilometers from the sounding point laterally, and such accumulations became practically almost unnoticeable.

The distorting lateral influence occurs because electrical current is not propagating in space in the form of, for example, an acoustic beam as in seismic exploration, but spreading according to the diffusion law in the direction of the lowest electrical resistivity. So, if electric dipole sounding (EDS) has high resolution in shallow exploration depths, it loses its resolution with increase in exploration depths due to dispersion of the source current.

Due to low electrical resistivity of sea water, marine EDS may be compared to logging with gradient probes AMN in wells filled with salty drilling mud. Field geophysicists stopped using such logging in wells filled with salty muds more than fifty years ago, and electrical resistivity of sedimentary rocks is determined using Laterolog, based on the logging principle of radial focusing of electric current (Laterolog. Doll H. G.).

The purpose of marine electrical exploration is to determine the presence of hydrocarbons in the traditional seismic structures, which in case of HC presence in them, differ in electrical resistivity from the surrounding rock by no more than 20-30 times. Such structures are hundreds of times more common than TWGP-type structures. For example, according to logging data all HC fields in West Siberia, Ob Estuary (Obskaya Guba), and on the Kara Sea shelf, including the largest in their geometrical dimensions, differ in electrical resistivity from the host rock only by three to thirty times. So, if such structures as TWGP in the Norway Sea do not need additional testing for HC presence after seismic exploration is performed, the majority of structures are risky to drill without testing for hydrocarbon presence due to the high cost of offshore drilling. For example, a recognized UK oil and gas consultancy Hannon Westwood (see "Upstream boom likely to frustrate North Sea investment opportunities," *First Break*, Vol. 25, January 2007, pp. 22-24) does not recommend to invest into drilling of medium and small seismic structures that had been left undrilled in the North Sea, because drilling success rate for such structures is currently only about 20% (one successful well out of five drilled).

On Sakhalin shelf, the situation for seismic exploration is also unfavorable. There, British Petroleum has drilled two exploration wells on large structures discovered by seismic exploration in the West-Schmidt Block (Sakhalin-4), at a cost of $103 million—according to media reports, and no hydrocarbon was found in either well (see newspaper *Vedomosti* of Jun. 3, 2008). Likewise, the well drilled in one of the largest in geometrical dimensions Admiralteyskaya structure in the Barents Sea also turned out to be dry (see Obmetko V. V. et al, "Prospective oil and gas bearing potential of Admiralteyskiy uplift," *International Conference on Oil and Gas of Arctic Shelf*, Murmansk, 12-14 Nov. 2008). This has to do with the fact that hydrocarbon accumulations are not always controlled by the structural factor alone.

There is a known method of marine geoelectrical exploration with electrical current focusing. This method is little affected by lateral inhomogeneities and allows with adequate probability to determine the presence of hydrocarbons in the structures discovered by seismic exploration and delineate them due to upholding the first axial or orthogonal electric potential difference equal to zero in the sounding measurement point located in the marine layer and determining several electro-physical parameters of geological medium (Rykhlinsky N. I., Davydycheva S. N., Lisin A. S., "Marine geological electrical exploration with electric current focusing," RF Patent No. 2884555, Jun. 1, 2005, Bulletin No. 27, 2006.) [3].

The disadvantage of this method is associated with the partial vertical focusing of the current: in its first version, only orthogonal horizontal component of the current density is eliminated, and in its second version—only axial horizontal component of the current density is eliminated.

Our proposed method solves the problem of detection and delineation with clearly expressed boundaries of oil and gas reservoirs in the continental shelf, not only in both shallow and deep waters, but also at large depths of the target below seafloor.

The technical result that allows solving this problem consists in opportunity to completely eliminate a horizontal component of the current density $j_{xy}$ in the sounding point, including both, orthogonal $j_y$, and axial $j_x$, thus entirely eliminating the lateral influence and therefore making possible detection and high contrast delineation of hydrocarbon accumulations in geological formations at great water depths, with the target depth of at least up to four kilometers below the seafloor.

This technical result is achieved by marine geoelectrical method in which electromagnetic field is excited in the analyzed medium along the axis of a straight-line sounding profile or transmitter line by passing through it periodic rectangular current impulses with pauses after each impulse using horizontal electric dipole source moving along the profile; and in each sounding point for the durations of each current impulse and each pause after the current is off, the sequence of instant values of the first and second differences of electric potentials is measured with constant time interval $\Delta t$, while the resultant first differences of electric potentials are upheld equal to zero;

then the interpretation parameters are formed and used together with the following differential equation of mathematical physics for electric field of a dipole source in electrochemically polarizing conductive medium:

$$\nabla \times \nabla \times \dot{E}(i\omega) = i\omega\mu \cdot \sigma(i\omega\sigma_0\eta\tau) \cdot \dot{E}(i\omega),$$

where $\nabla \times$—operator curl;

$\dot{E}(i\omega)$—electric field of a dipole source, expressed in the equation in frequency domain, V/m;

$\mu$—magnetic permeability, a constant value for nonmagnetic media, including geological sedimentary rock, equal to $4\pi \cdot 10^{-7}$ H/m;

$\sigma(i\omega\sigma_0\eta\tau)$—frequency-dependent electrical conductivity of medium elements, $\sigma_0$—electric conductivity of medium elements without taking into consideration the influence of induced polarization, S/m, $\eta$—coefficient of their induced polarization, and $\tau$—time decay constant of the induced polarization;

to solve the inverse mathematical problem and determine three electro-physical parameters characteristic to each medium element: electric conductivity $\sigma_o$, induced polarization $\eta$, and time decay constant of the induced polarization $\tau$; three images are reconstructed based on these parameters; a measurement profile is laid on the seafloor in accordance with the invention; this profile passes through the measurement devices stationary set on the seafloor, each consisting of five electrodes: one—central and four—located at equal distances around it in the corners of the square, two opposite sides of which are parallel to the axis of the profile;

geometrical sounding is performed within each "impulse-pause" period when the current is on, and transient sounding—during pauses after the current is switched off, measuring second difference of electrical potentials between all four external electrodes of the measuring device and the central electrode, and first differences of electrical potentials between any three pairs of the four external electrodes of this device;

it should be noted that the measurements in each measurement device stationary positioned on the measurement profile are performed when horizontal dipole source is moving along the transmitter line laid parallel to the measurement profile and shifted relative to it in plan view by a distance equal to (y=−b) in the orthogonal direction along y-axis and by a depth h in the vertical direction, sending current impulses into the analyzed medium at all positions of the dipole source from coordinate point [(x=−L), (y=−b), (z=+h)] to coordinate point [(x=+L), (y=−b), (z=+h)], after which a dipole source is turned around and moved to the other parallel transmitter line laid and shifted in plan view relative to the measuring profile by a distance equal to (y=+b) in the opposite direction along y-axis and by a water depth h in the vertical direction, and continue the measurements while it is moving in the opposite direction from coordinate point [(x=+L), (y=+b), (z=+h)] to coordinate point [(x=−L), (y=+b), (z=+h)]; two interpretation parameters independent from either the source current strength or the horizontal component of the current density ($j_x$=0 and $j_y$=0) in the sounding point are determined using the measured values of the first and second differences of electrical potential: one is $R_z(t_o)$—it is based on geometrical sounding at all positions of dipole source and calculated using the formula $$R_z(t_o)=[\Delta U_{M_1M_3}(I_{B_1A_1},t_o)]::\{[\Delta^2 U_{M_1M_2M_3M_4N}(I_{B_1A_1},t_o)]+k_1(t_o)\cdot[\Delta^2 U_{M_1M_2M_3M_4N}(I_{A_2B_2},t_o)]++k_2(t_o)\cdot[\Delta^2 U_{M_1M_2M_3M_4N}(I_{A_3B_3},t_o)]+k_3(t_o)\cdot[\Delta^2 U_{M_1M_2M_3M_4N}(I_{B_4A_4},t_o)]\};$$

and the other is $R_z(t_i)$—it is based on transient sounding with four most informative offsets, iteratively selected out of all probed offsets, with dipole source coordinates [(x=−a), (y=−b), (z=+h)], [(x=+a), (y=−b), (z=+h)], [(x=+a), (y=+b), (z=+h)] and [(x=−a), (y=+b), (z=+h)], and calculated using the formula $$R_z(t_i)=[\Delta U_{M_1M_3}(I_{B_1A_1},t_i)]::\{[\Delta^2 U_{M_1M_2M_3M_4N}(I_{B_1A_1},t_i)]+k_1(t_i)\cdot[\Delta^2 U_{M_1M_2M_3M_4N} \text{ out of all sounded} (I_{A_2B_2},t_i)]++k_2(t_i)[\Delta^2 U_{M_1M_2M_3M_4N}(I_{A_3B_3},t_i)]+k_3(t_i)\cdot[\Delta^2 U_{M_1M_2M_3M_4N}(I_{B_4A_4},t_i)]\},$$

where $k_1(t_o)$, $k_2(t_o)$, $k_3(t_o)$ are the focusing coefficients in case of geometrical sounding, which ensure equipotentiality of the closed line traversing through four external electrodes of the measuring device and thus eliminate, inside the contour of this line, a horizontal current density component $j_{xy}$ in each sounding point at all geometrical offsets during the current impulse; they are calculated from the following system of three equations:

$$\{[\Delta U_{M_1M_2}(I_{B_1A_1},t_o)]+k_1(t_o)\cdot[\Delta U_{M_1M_2}(I_{A_2B_2},t_o)]++k_2(t_o)\cdot[\Delta U_{M_1M_2}(I_{A_3B_3},t_o)]+k_3(t_o)\cdot[\Delta U_{M_1M_2}(I_{B_4A_4},t_o)]=0\}, \quad 1)$$

$$\{[\Delta U_{M_1M_3}(I_{B_1A_1},t_o)]+k_1(t_o)\cdot[\Delta U_{M_1M_3}(I_{A_2B_2},t_o)]++k_2(t_o)\cdot[\Delta U_{M_1M_3}(I_{A_3B_3},t_o)]+k_3(t_o)\cdot[\Delta U_{M_1M_3}(I_{B_4A_4},t_o)]=0\}, \quad 2)$$

$$\{[\Delta U_{M_1M_4}(I_{B_1A_1},t_o)]+k_1(t_o)\cdot[\Delta U_{M_1M_4}(I_{A_2B_2},t_o)]++k2(to)\cdot[\Delta UM1M4(IA3B3,to)]+k3(to)\cdot[\Delta UM1M4(IB4A4,to)]=0\}, \quad 3)$$

$k_1(t_i)$, $k_2(t_i)$, $k_3(t_i)$ are the focusing coefficients in case of transient sounding in each sounding point during the current pause at all transient times; they are calculated from the following system of three equations:

$$\{[\Delta U_{M_1M_2}(I_{B_1A_1},t_i)]+k_1(t_i)\cdot[\Delta U_{M_1M_2}(I_{A_2B_2},t_i)]++k_2(t_i)\cdot[\Delta U_{M_1M_2}(I_{A_3B_3},t_i)]+k_3(t_i)\cdot[\Delta U_{M_1M_2}(I_{B_4A_4},t_i)]=0\}, \quad 1)$$

$$\{[\Delta U_{M_1M_3}(I_{B_1A_1},t_i)]+k_1(t_i)\cdot[\Delta U_{M_1M_3}(I_{A_2B_2},t_i)]++k_2(t_i)\cdot[\Delta U_{M_1M_3}(I_{A_3B_3},t_i)]+k_3(t_i)\cdot[\Delta U_{M_1M_3}(I_{B_4A_4},t_i)]=0\}, \quad 2)$$

$$\{[\Delta U_{M_1M_4}(I_{B_1A_1},t_i)]+k_1(t_i)\cdot[\Delta U_{M_1M_4}(I_{A_2B_2},t_i)]++k_2(t_i)\cdot[\Delta U_{M_1M_4}(I_{A_3B_3},t_i)]+k_3(t_i)\cdot[\Delta U_{M_1M_4}(I_{B_4A_4},t_i)]=0\}, \quad 3)$$

$t_0$ is a point in time of current impulse passing when the transient electric field does not vary from its established value correspondent to the direct current;

$t_i$ are points in time, when the transient signals are measured in equal time intervals $\Delta t$ during the entire pause after the current is switched off;

[$\Delta^2$UM1M2M3M4N(I B1A1, to)], [$\Delta^2$UM1M2M3M4N(I A2B2, to)],

[$\Delta^2$UM1M2M3M4N(IA3B3, to)] and [$\Delta^2$UM1M2M3M4N(IB4A4, to)] are the instant values of second differences of electric potentials between four external electrodes M1M2M3M4 of the measuring device and central electrode N, measured at time $t_0$ with the active current in the dipole source when it is passing along both transmitter lines through the four respective coordinate points [−x, (y=−b), (z=+h)], [+x, (y=−b), (z=+h)], [+x, (y=+b), (z=+h)] and [−x, (y=+b), (z=+h)] located at equal distances from the central electrode N of the measuring device;

[ΔUM1M2(I B1A1, to)], [ΔUM1M2(IA2B2, to)], [ΔUM1M2(IA3B3, to)],

[ΔUM1M2(I B4A4, to)], [ΔUM1M3(I B1A1, to)], [ΔUM1M3(IA2B2, to)],

[ΔUM1M3(IA3B3, to)], [ΔUM1M3(M4A4, to)], [ΔUM1M4(I B1A1, to)],

[ΔUM1M4(IA2B2, to)], [ΔUM1M4(IA3B3, to)], and [ΔUM1M4(I B4A4, to)] are the instant values of three first differences of electrical potentials between the three pairs of external electrodes M1M2 M1M3 M1M4 measured at time to during the current passing in the dipole source when it is moving along both transmitter lines through the four respective coordinate points [−x, (y=−b), (z=+h)], [+x, (y=−b), (z=+h)], [+x, (y=+b), (z=+h)] and [−x, (y=+b), (z=+h)] located at equal distances from the central electrode N of the measuring device;

UM1M2M3M4N(I B1A1, ti)], [$\Delta^2$UM1M2M3M4N(I A2B2, ti)],

[$\Delta^2$UM1M2M3M4N(IA3B3, ti)], and [$\Delta^2$UM1M2M3M4N(IB4A4, ti)] are the instant values of second differences of electrical potentials between four external electrodes M1M2M3M4 of the measuring device and central electrode N, measured at time $t_i$ of transient sounding during a current pause in the dipole source, when it is passing along both transmitter lines through four respective coordinate points [(x=−a), (y=−b), (z=+h)], [(x=+a), (y=−b), (z=+h)], [(x=+a), (y=+b), (z=+h)] and [(x=−a), (y=+b), (z=+h)], located at equal distances from the central electrode N of the measuring device;

[ΔUM1M2(I B1A1, ti)], [ΔUM1M2(IA2B2, ti)], [ΔUM1M2(IA3B3, ti)],

[ΔUM1M2(I B4A4, ti)], [ΔUM1M3(I B1A1, ti)], [ΔUM1M3(IA2B2, ti)],

[ΔUM1M3(IA3B3, ti)], [ΔUM1M3(IB4A4, ti)], [ΔUM1M4(I B1A1, ti)],

[ΔUM1M4(IA2B2, ti)], [ΔUM1M4(IA3B3, ti)], and [ΔUM1M4(I B4A4, ti)] are the instant values of three first differences of electrical potentials between the three pairs of external electrodes M1M2 M1M3 M1M4, measured at time $t_i$ of transient sounding during a current pause in the dipole source, when it is passing along both transmitter lines through four respective coordinate points [(x=−a), (y=−b), (z=+h)], [(x=+a), (y=−b), (z=+ h)], [(x=+a), (y=+b), (z=+h)] and [(x=−a), (y=+b), (z=+h)] located at equal distances from the central electrode N of the measuring device.

This technical result is also achieved in the marine geoelectrical exploration method according to the invention by laying the transmitter lines for traversing of horizontal dipole source at given water depths or at daylight sea surface.

The technical result is also achieved in the marine geoelectrical exploration method according to the invention, due to distance L being equal to six or more kilometers, distances a and b being equal to one or more kilometer, and dipole source submergence depth h being set in the band from twenty meters above the seafloor to the daylight surface.

The technical result is also achieved in the marine geoelectrical exploration method according to the invention by placing the measuring devices along the measuring profile with the equal spacing of 200÷1000 meters.

The setup required to implement the proposed method (FIG. 1) includes a measuring device for measuring the first and second differences of electrical potentials. This device is located on the measurement profile-1, laid on the seafloor.

Figure 1:
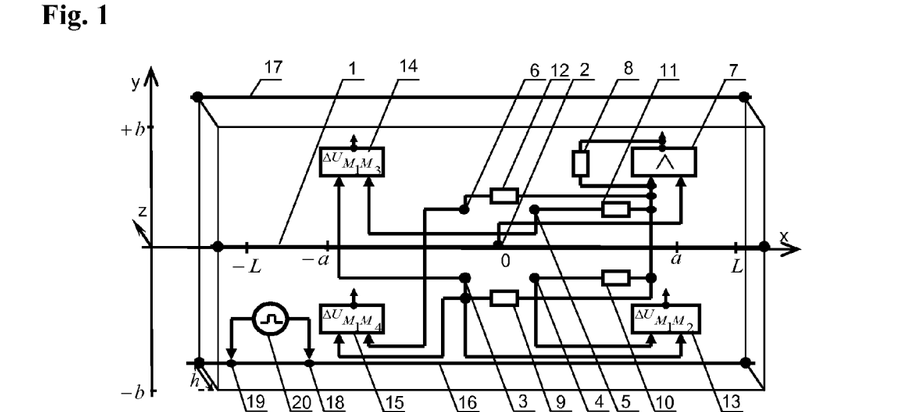
FIG. 1 shows the device setup scheme for the implementation of the proposed technique.
Figure 2:
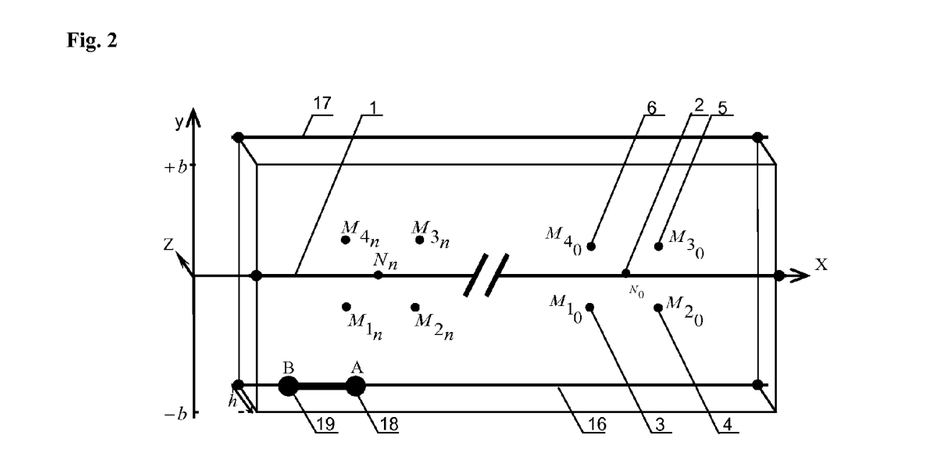
FIG. 2 shows in plan view the seafloor layout of the measuring device group spread on the sounding measurement profile, also depicted are two profiles, parallel to the measuring profile, along which the dipole source is moved within the water layer at a height h above the seafloor or on the daylight sea surface.

Here 2—N, 3—M1, 4—M2, 5—M3, and 6—M4 are electrodes of the second difference of electric potentials of the measuring device between all four external electrodes M1 M2 M3 M4 and central electrode N; 3 and 4 are electrodes M1 and M2 of the first detector of the first difference of electrical potential; 3 and 5 are electrodes M1 and M3 of the second detector of the first difference of electrical potential; 3 and 6 are electrodes M1 and M4 of the third detector of the first difference of electrical potential (any number of such 5-electrode detectors may be placed on the measuring profile 1 (FIG. 2); besides, the same kind of detectors may be placed on other measuring profiles, parallel to profile-1); 7—a meter for measuring the second difference of electric field potentials $\Delta^2$UM1M2M3M4N between all four external electrodes M1 M2 M3 M4 of the measuring device and central electrode N; 8—the scaling feedback resistance of the input amplifier of meter 7; 9, 10, 11, 12—equal summing resistances for summing up potentials UM1 UM2, UM3, UM4 of the external measuring electrodes M1 M2 M3 M4; 13—meter of the first difference of electric field potentials $\Delta$UM1M2 between electrodes M1 M2; 14—meter of the first difference of electric field potentials $\Delta$UM1M3 between electrodes M1 M3; 15—meter of the first difference of electric field potentials $\Delta$UM1M4 between electrodes M1 M4.

In order to ensure the focusing of electric field in the sounding point N, two profiles parallel to the measurement profile-1 are placed to the right and left of it in the water layer at a height h above the seafloor, or on the sea surface: 16 is the first one, and 17 is the second one. A horizontal dipole current source consisting of two electrodes 18-A and 19-B is moved along these two profiles. The electrodes are fed by rectangular current impulse generator-20 with pauses between the impulses.

Figure 3:
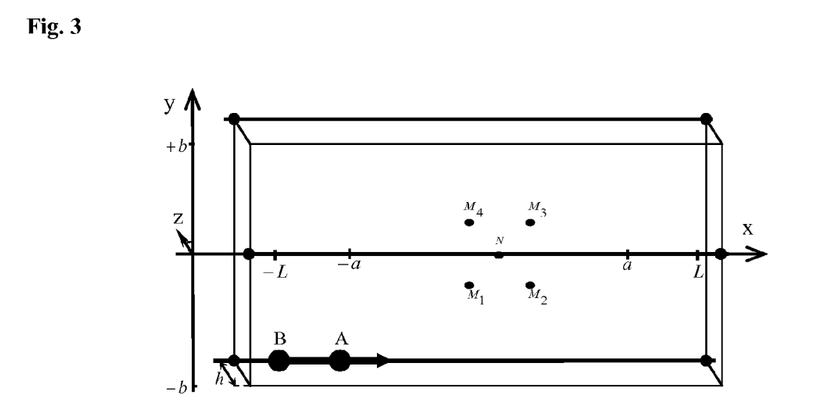
FIG. 3 shows a diagram of dipole movement along the first of the two profiles parallel to the measurement profile.

FIG. 3 shows the advancement of dipole source AB along the first profile-16 located in the water at a height h above the seafloor or on the daylight sea surface, parallel to the measurement profile-1 and shifted relative to it in plan view by a distance equal to (y=−b). The advancement of dipole source AB along profile-16 is carried out from its starting point [−x, (y=−b), (z=+h)] to its end [+x, (y=−b), (z=+h). Then, the dipole source AB (FIG. 4) is transferred to the second profile-17, which is parallel to the measurement profile and shifted relative to it in plan view by a distance equal to (y=+b) and in vertical direction—by depth h. The advancement of dipole source AB along profile-17 is carried out from coordinate point [+x, (y=+b), (z=+h)] to the coordinate point [−x, (y=+b), (z=+h)].

Figure 4:
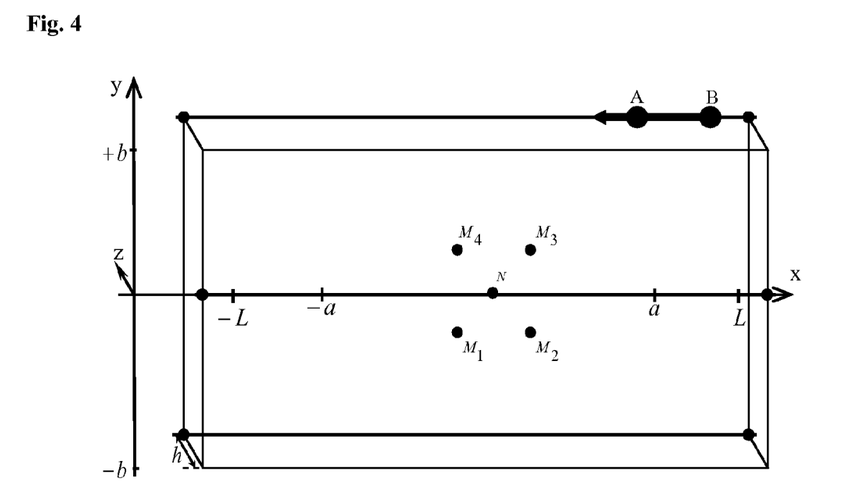
FIG. 4 shows the dipole source movement diagram along the second of the two profiles parallel to the measurement profile.

Such complex profiling is necessary in order to measure any three first differences of electrical potentials between four external electrodes of the measuring device to ensure equal potentials between these electrodes from the resulting impact of dipole source when it is passing through four coordinate points [−x, (y=−b), (z=+h)], [+x, (y=−b), (z=+h)], [+x, (y=+b), (z=+h)] and [−x, (y=+b), (z=+h)]. This is apparent, for example, from the three measured first differences of electrical potentials $\Delta$UM1M2=UM1−UM2=0, $\Delta$UM1M3=UM1−UM3=0, $\Delta$UM1M4=UM1−UM4=0. Hence it follows that UM1=UM2=UM3=UM4. Combinations of any equal to zero three differences of electrical potentials between four external electrodes of the measuring device will always result in equal potentials between these four electrodes.

Equal potentials between four external electrodes of the measuring device ensure equipotentiality of the closed line, passing through these four external electrodes, and thus elimination inside the contour of this line, of the horizontal current density component $j_{xy}$ in each sounding point, which ensures focusing of electric current along the vertical coordinate z inside this closed equipotential line.

Figure 6:
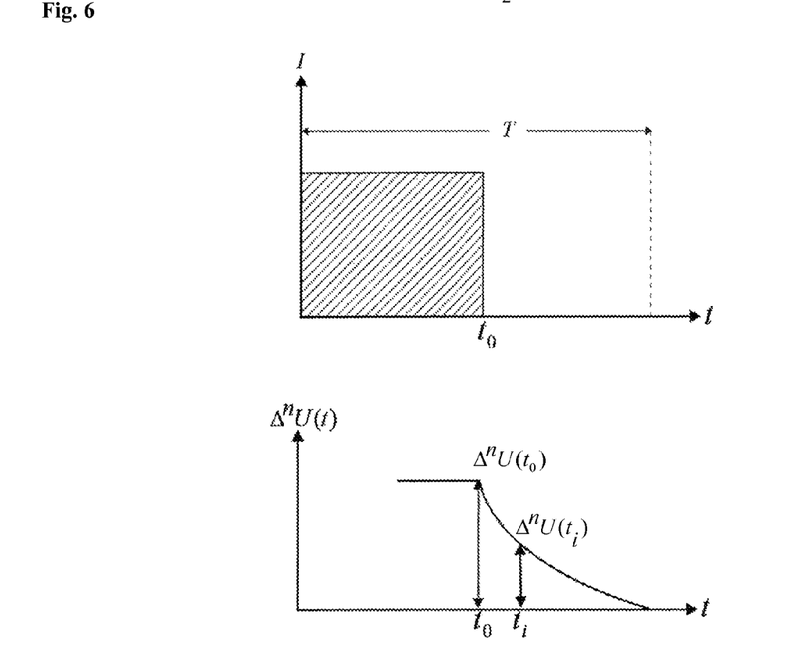
FIG. 6 shows the shapes of single impulses in the time domain t: a) the shape of a single rectangular current impulse I in the circuit of dipole source AB; b) the shapes of the first and second differences of electrical potentials.

FIG. 6 (a) shows the shape of a single rectangular current impulse I in the circuit of the dipole source AB in time domain t. Here T is a period (current impulse-pause).

FIG. 6 (b) shows the shape of one of the impulses Δ″U, where n=1 and 2. Also shown is one of the values Δ″U (t₀) in the period of feeding current into the dipole source AB and one of the values Δ″U(t_i) in the current pause.

Let's consider the basis of the proposed technique, its implementation and some new opportunities for marine geoelectrical exploration.

The proposed technique of marine geoelectrical exploration makes it possible using three profiles (FIG. 1) to eliminate lateral impact by performing focusing of the electric current. It provides for significant sounding depths and high lateral resolution.

It is known that electromagnetic field in the medium with poor conductivity is propagating over time t according to the decaying differential wave equation of mathematical physics (which in turn follows from the first and second Maxwell equations) for electric field, which is also true for the impulse variation of electric field:

$$\nabla \times \nabla \times E(t) = \mu \sigma_o \frac{\partial E(t)}{\partial t} + \mu \varepsilon \frac{\partial^2 E(t)}{\partial t^2}, \quad (2)$$

where

∇×—operator curl;

E—electric field, V/m;

μ—magnetic permeability, a constant value for nonmagnetic media, including geological sedimentary rock, equal to $4\pi \cdot 10^{-7}$ Henry/m;

$\sigma_o$—electric conductivity of non-polarizing medium, Siemens/m;

∈—dielectric permeability, Farada/m. (V. A. Govorkov, "Electrical and Magnetic Fields", M., Gosenergoizdat, 1960, pp. 257-263) [5].

Since $\sigma_o$ is numerically many times greater than ∈ in case of highly conductive media, including geological sedimentary rocks, the second member of the equation on the right-hand side (2) is negligible compared to the first member of the equation and can be dropped (L. L. Vanian, "Foundations of electromagnetic sounding," M., Nedra, 1965, pp. 28-30) [6]. Physically it means that displacement currents in conductive media can be ignored due to their negligible values compared to conduction currents. In this case, the equation (2) is simplified to:

$$\nabla \times \nabla \times E(t) = \mu \sigma_o \frac{\partial E(t)}{\partial t}. \quad (3)$$

In geoelectrical exploration this equation has analytical solution only for one-dimensional axial-symmetric media, in particular for media with infinite horizontal interface boundaries. Note that in reality geological medium is always three-dimensional and inhomogeneous since it, firstly, contains local near-surface inhomogeneities; secondly, in general, geological medium along the surveyed profile is constantly changing its electro-physical parameters. However, equation (3), as it was mentioned earlier, is solved analytically only for one-dimensional axial-symmetric media, including the medium with horizontal plane-parallel interface boundaries.

Figure 5:
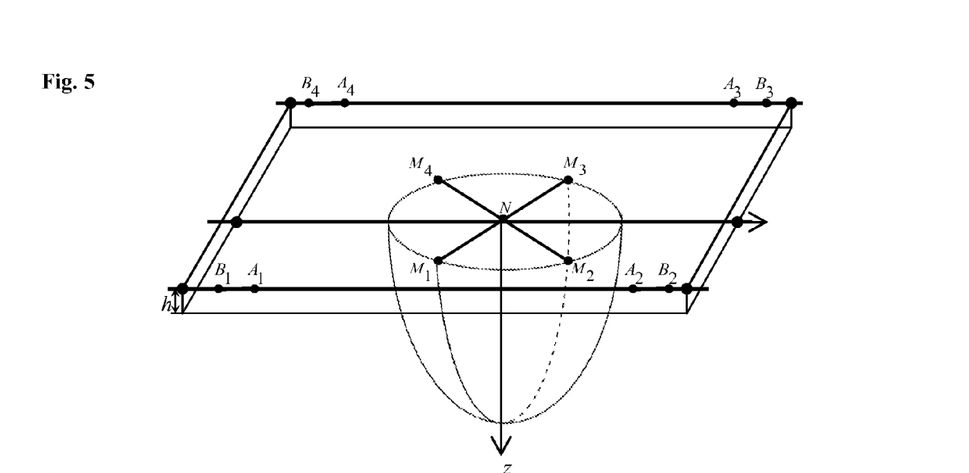
FIG. 5 shows the shape of electric field with electric current focusing in the direction of the vertical coordinate z achieved by upholding equality to zero of the first differences of electric potential between all pairs of external measuring electrodes from the resulting impact of four dipole sources located at equal distances from the central electrode N of the measuring device. In order to uphold the equality to zero of the first differences of electrical potentials between all pairs of external electrodes from the resulting impact of four dipole sources, it is sufficient to measure three first differences of electrical potentials between any three pairs of four external electrodes of this device. With differences of electrical potentials between four electrodes M equal to zero, the currents from four current sources AB, penetrated inside the square formed by these electrodes, are being focused and in the future can only spread in the vertical direction along coordinate Z. In addition, the vertical direction of electrical current, provided the latter is focused, is maintained based on the isoperimetric variation according to Lagrange function (principle of least action) (Landau L. V., Lifshitz E. M., Field theory, 2nd edition, M.-L., 1948). In the plane M1 M2 M3 M4 N, the electric field potential is taking a shape of rotating spheroid with the minimum in point N.

Therefore, solution of equation (3) can be used in the inverse geoelectrical problems for prospecting and delineation of oil and gas reservoirs only if focusing of electric current of electromagnetic field dipole source is performed during field measurements, because in this case in point N (FIG. 5) the shape of field propagation under the resultant action of four dipole sources $B_1A_1, A_2B_2, A_3B_3$, and $B_4A_4$ is practically always the same in both, three-dimensional inhomogeneous medium and one-dimensional medium with horizontal plane-parallel interface borders, provided that resultant first differences of the electric potential between all pairs of external electrodes are upheld equal to zero.

Formulas (4), (5), (6) and (7) imply that in accordance with Ohm law the aggregate component of the horizontal current density $j_{xy}$, in the sounding point N is equal to zero based on principle of superposition.

Thus, the focusing of electric current performed in measuring point leads to elimination of the horizontal component of electric current density $j_{xy}$, and preservation of only vertical component of current density $j_z$, which makes it possible to eliminate distorting lateral influence on the sounding results and to solve correctly the inverse problem in three-dimensional inhomogeneous media using the known analytical solution of one-dimensional equation (14) for multi-layered media with plain-parallel interface boundaries.

In the proposed method the respective formulas for measured electrical parameters were derived in order to ensure the elimination of horizontal component of electric current density $j_{xy}$, in the sounding point N with coordinates [(x=0), (y=0), (z=0): one is $R_z(t_o)$; it is based on geometrical sounding at all positions of dipole source and calculated using the formula:

$$Rz(to) = [\Delta UM1M3(IB1A1,to)] :: \{[\Delta^2 UM1M2M3M4N(IB1A1,to)] + k1(to) \cdot [\Delta^2 UM1M2M3M4N(IA2B2,to)] + k2(to) \cdot [\Delta^2 UM1M2M3M4N(IA3B3,to)] + k3(to) \cdot [\Delta^2 UM1M2M3M4N(IB4A4,to)]\}, \quad (4)$$

and the other is $R_z(t_i)$; it is based on transient sounding with four most informative offsets, iteratively selected out of all probed offsets, with dipole source coordinates [(x=−a), (y=−b), (z=+h)], [(x=+a), (y=−b), (z=+h)], [(x=+a), (y=+b), (z=+h)] and [(x=−a), (y=+b), (z=+h) and is calculated by formula:

$$Rz(ti) = [\Delta UM1M3(IB1A1,ti)] :: \{[\Delta^2 UM1M2M3M4N(IB1A1,ti)] + k1(ti) \cdot [\Delta^2 UM1M2M3M4N(IA2B2,ti)] + k2(ti) \cdot [\Delta^2 UM1M2M3M4N(IA3B3,ti)] + k3(ti) \cdot [\Delta^2 UM1M2M3M4N(IB4A4,ti)]\}, \quad (5)$$

where k1(to), k2(to), and k3(to) are the focusing coefficients in case of geometrical sounding, which ensure equipotentiality of the closed line traversing through four external electrodes of the measuring device and thus eliminate, inside the contour of this line, a horizontal current density component $j_{xy}$ in each sounding point at all geometrical offsets during the current impulse; they are calculated from the following system of three equations:

$$\{[\Delta UM1M2(IB1A1,to)] + k1(to) \cdot [\Delta UM1M2(IA2B2,to)] + k2(to) \cdot [\Delta UM1M2(IA3B3,to)] + k3(to) \cdot [\Delta UM1M2(IB4A4,to)] = 0\}, \quad 1)$$

$$\{[\Delta UM1M3(IB1A1,to)] + k1(to) \cdot [\Delta UM1M3(IA2B2,to)] + k2(to) \cdot [\Delta UM1M3(IA3B3,to)] + k3(to) \cdot [\Delta UM1M3(IB4A4,to)] = 0\}, \quad 2)$$

$$\{[\Delta UM1M4(IB1A1,to)] + k1(to) \cdot [\Delta UM1M4(IA2B2,to)] + k2(to) \cdot [\Delta UM1M4(IA3B3,to)] + k3(to) \cdot [\Delta UM1M4(IB4A4,to)] = 0\}, \quad (6)$$

k1(ti), k2(ti), k3(ti) are the focusing coefficients in case of transient sounding which ensure equipotentiality of the closed line traversing through four external electrodes of the measuring device, and thus eliminate, inside the contour of this line, a horizontal current density component $j_{xy}$ in each sounding point at all times of transient sounding during the current pause; they are calculated from the following system of three equations:

$\{[\Delta UM1M2(IB1A1,ti)]+k1(ti)\cdot[\Delta UM1M2(IA2B2, ti)]++k2(ti)\cdot[\Delta UM1M2(IA3B3,ti)]+k3(ti)\cdot[\Delta UM1M2(IB4A4,ti)]=0\}$, (1)

$\{[\Delta UM1M3(IB1A1,ti)]+k1(ti)\cdot[\Delta UM1M3(IA2B2, ti)]++k2(ti)\cdot[\Delta UM1M3(IA3B3,ti)]+k3(ti)\cdot[\Delta UM1M3(IB4A4,ti)]=0\}$, (2)

$\{[\Delta UM1M4(IB1A1,ti)]+k1(ti)\cdot[\Delta UM1M4(IA2B2, ti)]++k2(ti)\cdot[\Delta UM1M4(IA3B3,ti)]+k3(ti)\cdot[\Delta UM1M4(IB4A4,ti)]=0\}$, (7)

$t_0$ is a point in time of current impulse passing when the transient electric field does not vary from its established value correspondent to the direct current;

$t_i$ are points in time, when the transient signals are measured in equal time intervals $\Delta t$ during the entire pause after the current is turned off;

$[\Delta^2 UM1M2M3M4N(I B1A1, to)]$, $[\Delta^2 UM1M2M3M4N(I A2B2, to)]$, $[\Delta^2 UM1M2M3M4N(IA3B3, to)]$, and $[\Delta^2 UM1M2M3M4N(IB4A4, to)]$—are the instant values of second differences of electric potentials between four external electrodes M1M2M3M4 of the measuring device and central electrode N, measured at time to during the current passing in the dipole source when it is moving along both transmitter lines through the four respective coordinate points $[-x, (y=-b), (z=+h)]$, $[+x, (y=-b), (z=+h)]$, $[+x, (y=+b), (z=+h)]$ и $[-x, (y=+b), (z=+h)]$ located at equal distances from the central electrode N of the measuring device;

$[\Delta UM1M2(I B1A1, to)]$, $[\Delta UM1M2(IA2B2, to)]$, $[\Delta UM1M2(IA3B3, to)]$,
$[\Delta UM1M2(I B4A4, to)]$, $[\Delta UM1M3(I B1A1, to)]$, $[\Delta UM1M3(IA2B2, to)]$,
$[\Delta UM1M3(IA3B3, to)]$, $[\Delta UM1M3(IB4A4, to)]$, $[\Delta UM1M4(I B1A1, to)]$,
$[\Delta UM1M4(IA2B2, to)]$, $[\Delta UM1M4(IA3B3, to)]$, $[\Delta UM1M4(I B4A4, to)]$ are the instant values of three first differences of electrical potentials between the three pairs of external electrodes M1M2 M1M3 M1M4 measured at time $t_0$ during the current passing in the dipole source when it is moving along both transmitter lines through the four respective coordinate points $[-x, (y=-b), (z=+h)]$, $[+x, (y=-b), (z=+h)]$, $[+x, (y=+b), (z=+h)]$ and $[-x, (y=+b), (z=+h)]$ located at equal distances from the central electrode N of the measuring device;

$[\Delta^2 UM1M2M3M4N(I B1A1, ti)]$, $[\Delta^2 UM1M2M3M4N(I A2B2, ti)]$,
$[\Delta^2 UM1M2M3M4N(IA3B3, ti)]$, $[\Delta^2 UM1M2M3M4N(IB4A4, ti)]$—are the instant values of second differences of electrical potentials between four external electrodes M1M2M3M4 of the measuring device and central electrode N, measured at time $t_i$ of transient sounding during a current pause in the dipole source, when it is passing along both transmitter lines through four respective coordinate points $[(x=-a), (y=-b), (z=+h)]$, $[(x=+a), (y=-b), (z=+h)]$, $[(x=+a), (y=+b), (z=+h)]$ and $[(x=-a), (y=+b), (z=+h)]$ located at equal distances from the central electrode N of the measuring device;

$[\Delta UM1M2(I B1A1, ti)]$, $[\Delta UM1M2(IA2B2, ti)]$, $[\Delta UM1M2(IA3B3, ti)]$,
$[\Delta UM1M2(I B4A4, ti)]$, $[\Delta UM1M3(I B1A1, ti)]$, $[\Delta UM1M3(IA2B2, ti)]$,
$[\Delta UM1M3(IA3B3, ti)]$, $[\Delta UM1M3(IB4A4, ti)]$, $[\Delta UM1M4(I B1A1, ti)]$,
$[\Delta UM1M4(IA2B2, ti)]$, $[\Delta UM1M4(IA3B3, ti)]$, $[\Delta UM1M4(I B4A4, ti)]$—are the instant values of three first differences of electrical potentials between the three pairs of external electrodes M1M2 M1M3 M1M4, measured at time $t_i$ of transient sounding during a current pause in the dipole source when it is passing along both transmitter lines through four respective coordinate points $[(x=-a), (y=-b), (z=+h)]$, $[(x=+a), (y=-b), (z=+h)]$, $[(x=+a), (y=+b), (z=+h)]$ and $[(x=-a), (y=+b), (z=+h)]$ located at equal distances from the central electrode N of the measuring device.

Formulas (4) and (5) ensure that the horizontal component of current density j is equal to zero regardless of current strength in dipole AB in any three-dimensional inhomogeneous medium at each point in space in the direction of vertical coordinate z in the sounding point N in the plane passing through measuring electrodes at any distances x between dipole source AB and the sounding point N—in case of geometrical sounding, and throughout the entire duration of time $t_i$—in case of transient sounding. This occurs all the time, regardless of the fact that as distance x between dipole source AB and measurement point N or transient time t change, coefficients k1(to), k2(to), k3(to) and k1(ti), k2(ti), k3(ti) are also changing. As a result, the lateral influence is eliminated in the inverse problem solution, i.e. electric field in the three-dimensional inhomogeneous medium in the sounding point N, described by formulas (4) and (5), practically always coincides with the field in one-dimensional horizontally layered medium with infinite interface boundaries.

This allows solving the inverse problem in measuring point N for three-dimensional inhomogeneous medium using a known analytical solution for one-dimensional medium with horizontally layered interface boundaries.

Note also that equation (3) is the equation of electromagnetic field propagation over time in the conductive non-polarizing medium, which coincides with the known in mathematical physics equation of thermal conductivity or diffusion and is commonly used in resistivity methods of geophysics to study the propagation of variable electromagnetic field into the depth of analyzed geological rock formations.

With that, it is assumed that electrical conductivity $\sigma_o$ of a geological horizon is the main and essentially the only parameter defining its electrical characteristics, which has a constant value for each horizon and is indifferent to the electromagnetic field excitation frequency. However, when excited by the low-frequency electrical current used in geophysics, geological sedimentary rocks are characterized by polarization $\eta$ induced by this current. Induced polarization is a dimensionless value dependent on electrochemical activity of sedimentary rock. It is defined as a ratio of potential differences measured on the core samples of analyzed rock in 0.5 sec after current impulses are switched off ($\Delta U_{IP}$) and before the current switch off ($\Delta U$). This ratio is usually expressed as a percentage.

$$\eta(t = 0.5 \text{ s}) = \frac{\Delta U_{IP}(t = 0.5 \text{ s})}{\Delta U} \cdot 100\%. \qquad (8)$$

Induced polarization of sedimentary rock has a unique stability among physical parameters and is essentially independent from the rock composition and temperature. For ion-conductive (sedimentary) rock it depends on many factors, such as water saturation and porosity, solution composition and concentration in rock pores, pore structure and size, clay mineral content, and etc. (V. A. Komarov, "Electrical Exploration by Polarization Method", L., Nauka, 1980, p. 392) [7]. Most importantly, induced polarization carries key information about the presence of highly polarized oil and gas reservoirs in geological medium.

It was established (W. H. Pelton, S. H. Ward, P. G. Hallof, W. R. Sill and P. H. Nelson, "Mineral discrimination and removal of inductive coupling with multifrequency IP," *Geophysics* 43, 1978, c. 588-603) [8] that electrical conductivity of sedimentary rock is not constant, but depends on induced polarization and electric field excitation frequency, which is described in particular by an empirical formula proposed by K. S. Cole and R. H. Cole in the form of harmonic variation over time $$\sigma(i\omega\sigma_o\eta\tau) = \sigma_o\left(1 - \frac{\eta}{1+(i\omega\tau)^c}\right), \quad (9)$$

where electrical conductivity depends on $\omega$, $\sigma_o$, $\eta$, and $\tau$, and $\eta$—induced rock polarization, a dimensionless value, typically expressed as a percentage;

$\tau$—time decay constant, defining the decay rate of potential differences, associated with induced polarization, sec.

$\omega$—harmonic frequency of electrical excitation, Hertz;

c—dimensionless exponent, which is not a physical parameter of the rock, but $\sigma(i\omega\sigma_o\eta\tau)$ depends on it as well.

Unlike dielectric permeability $\in$, induced polarization $\eta$ at low frequencies of electrical excitation numerically is not that small in comparison with electric conductivity $\sigma_o$ of sedimentary geological rock, measured, for example, at high frequency currents ($\omega \to \infty$), when, as can be seen from formula (9), induced polarization does not manifest itself. Therefore, induced polarization cannot be ignored anymore when geoelectrical parameters of sedimentary rock are analyzed at low-frequency alternating current for the purposes of prospecting and delineation of oil and gas reservoirs.

It is well known ("Electrical Prospecting, Geophysicist's Manual", edited by V. K. Khmelevsky, et al., M., Nedra, 1989, Book Two, pp. 99-102) [9] that in 0.5 sec. after the excitation current impulse is switched off, the magnitude of induced polarization of potential differences for a geological sedimentary rock, in spite of its rapid decay, still remains at the levels ranging from 0.2% to 10% of numerical magnitude of potential differences of the direct electric field, associated with electrical conductivity $\sigma_o$, measured, as it was mentioned above, at high frequency currents when induced polarization does not manifest itself. In order to preserve the format of formula (9), let's write the diffusion equation (3) for a case of harmonic variation of the electromagnetic field strength over time, keeping in mind that $\dot{E}(i\omega) = E_m \cdot e^{i\omega t}$, and considering that $$\frac{\partial E(t)}{\partial t} \Leftrightarrow i\omega \cdot \dot{E}(i\omega) \quad (10)$$

and $$\frac{\partial^2 E(t)}{\partial t^2} \Leftrightarrow -\omega^2 \cdot \dot{E}(i\omega). \quad (11)$$

Then, in view of transformation (10) equation (3) for non-polarizing conductive medium can be written as $$\nabla \times \nabla \times \dot{E}(i\omega) = i\omega\mu\sigma_o \cdot \dot{E}(i\omega). \quad (12)$$

But since electrical conductivity of sedimentary rock is not constant, but depends on induced polarization and excitation frequency as described by formula (9), equation (12), in view of this formula, already gets not one parameter $\sigma_o$, but four parameters, $\sigma_o$, $\eta$, $\tau$ and c, defining the properties of polarized medium, and for a case of harmonic variation of electromagnetic field over time it changes to $$\nabla \times \nabla \times \dot{E}(i\omega) = i\omega\mu\sigma_o\left[1 - \frac{\eta}{1+(i\omega\tau)^c}\right] \cdot \dot{E}(i\omega), \quad (13)$$

or in general form, in view of (9):

$\nabla \times \nabla \times \dot{E}(i\omega) = i\omega\mu \cdot \sigma(i\omega\sigma_o\eta\tau) \cdot \dot{E}(i\omega).$ (14)

Substitution of frequency-independent electrical conductivity $\sigma_o$, which is present in equation (12), with frequency dependent $\sigma(i\omega)$ present in equation (14) is mathematically correct and proved theoretically in (A. K. Kulikov, E. A. Shemyakin, "Electric survey using phase induced polarization method", Moscow, Nedra, 1978, pp. 24-26)[10] and (J. R. Wait, "Geo-Electromagnetics," Moscow, Nedra, 1987, pp. 61-62)[11].

For the proposed method, the problem of discovering oil and gas reservoirs in the analyzed rock thickness is solved as inverse mathematical problem based on equation (14) as a function of distance x between dipole source AB and measurement point N and as a transient function of time t, and consequently, as a function dependent on distance x and time t of electromagnetic field depth penetration, with respect to three independent from each other parameters of the medium: electrical conductivity $\sigma_o$; induced polarization $\eta$; time decay constant of induced polarization $\tau$, and the forth parameter—exponent c, which follows from empirical formula (9) and is not a parameter of the medium.

In the proposed method, this problem is solved as inverse mathematical problem using the full array of data which is obtained using the proposed technique for at least two normalized electrical parameters impartial to the source current strength, described by formulas (4) (5), (6) and (7).

It ought to be noted that when sounding is performed using the proposed technique, digitized data for the first and second differences of electrical potentials is obtained in each measurement point along the entire length of the profile with equal sampling intervals $\Delta t$ every time the current is switched on in the dipole source in the course of sounding (geometrical sounding), and also during current pauses (transient sounding).

With this said, while for geometrical sounding it is necessary to obtain information about the medium response to each current impulse, which determines the sounding device offset, for transient sounding it is sufficient to obtain information from one sounding device, but with the offset that carries most information about the analyzed geologic medium (note that with long offsets the transient process signals are weak and it is hard to separate them from the background noise, and with short offsets transient sounding has shallow penetration depths). That is why there is another particular problem to be solved within the solution of the inverse problem—the iterative selection of the most informative offset out of all probed by the sounding device.

Ultimately, with iterative approach to solving the inverse problem we can find a model of the medium which is the very close to the analyzed medium by its geometrical structure and electrical parameters, reconstruct geoelectrical profiles of the obtained parameters $\sigma_o$, $\eta$, and $\tau$, and identify the sections on these profiles with anomalous values corresponding to the locations of oil and gas reservoirs in plan view.

An example of practical implementation.

A setup scheme required for implementation of the proposed technique is presented in FIG. 1. The setup scheme shows a dipole source AB (18 and 19), placed in the water at the height h above the seafloor or on the daylight sea surface, and charged by generator of rectangular current impulses (20). Note that placing dipole source on the sea surface simplifies the structure of the cable streamer and provides an opportunity to increase electrical current in dipole source circuit. With dipole source located on the daylight surface the proposed technique makes it possible to conduct surveys in shallow water (up to 300 m). In case of significant sea depths (greater than 300 m) due to absorption of transient process signals in the highly conductive sea water layer, horizontal dipole source is submersed to a given depth and its movement along the two transmitter lines is performed at that depth.

The setup (FIG. 1) includes a measuring device for measuring electrical potential differences. This measuring device is located on the measurement profile-1 laid on the seafloor.

Here, 2—N, 3—M1, 4—M2, 5—M3, and 6—M4 are the electrodes of the measuring device; 7 is a meter for measuring the second differences of electric field potentials $\Delta^2 UM1M2M3M4N$ between four external electrodes M1 M2 M3 M4 of the measuring device and central electrode N; 8 is the scaling feedback resistance of the operational input amplifier of meter 7; 9, 10, 11, 12 are identical summing resistors for summing potentials UM1, UM2, UM3, UM4 of the external measuring electrodes M1 M2 M3 M4.

Summation of potentials UM1, UM2, UM3, UM4 of external measuring electrodes M1 M2 M3 M4 is achieved using linear operational amplifier which performs algebraic addition of four input signals UM1, UM2, UM3, UM4 with multiplication by a given constant R8/R9, provided that R9=R10=R11=R12 (see B. Ya. Kogan, "Electronic modeling apparatus and their use for investigation of automatic control systems," Physmatgiz, M., 1963, pp. 60-64).

The second difference of electric potentials from formulas (4) and (5) is determined using the relation $\Delta^2 UM1M2M3M4N = \Delta^2 UM1N$ $M3 + \Delta^2 UM2$ $NM4 =$ $(\Delta UM1N - \Delta UNM3) + (\Delta UM2N - \Delta UNM4) = (UM1 - UN) - (UN - UM3) + (UM2 - UN) - (UN - UM4) = UM1 + UM2 + UM3 + UM4 - 4UN$. As a result, the scaling resistance ratio R8/R9 in the operational amplifier of meter 7 should be equal to ¼.

The device also performs measuring of three first differences of electric potentials: $\Delta UM1M2$—between electrodes M1 and M2, $\Delta UM1M3$—between electrodes M1 and M3, and $\Delta UM1M4$=between electrodes M1 and M4.

Measured differences are amplified by amplifiers 7, 13, 14 and 15 and computer processed in order to obtain numerical values using (4), (5), (6) and (7).

Note that based on the mathematical modeling data, distance L is equal to up to six or more kilometers, distances a and b are equal to up to one or more km, dipole source submersion depth h is set in the range from 20 meters above the seafloor to the daylight surface.

The invention claimed is:

1. A method for estimating at least one geophysical property, the method comprising:
   using a plurality of transmitter electrodes distributed in a conductive medium, periodically passing rectangular current impulses through the media;
   collecting a sequence of sounding data between each of the impulses with a receiver electrode disposed between the plurality;
   determining a first difference and a second difference of the electric potential between points of the collected data;
   when each of the transmitters is excited, acquiring a focused measurement by simultaneously calculating a combination of at least one orthogonally weighted measurement and at least one axially weighted measurement obtained by the receiver, wherein the weighting is obtained from a condition of equipotentiality in four outer electrodes of the receiver;
   using the focused measurement to estimate at least one of the following geophysical properties of the geological formation:
   $\sigma(i\omega\sigma_0\eta\tau)$—frequency-dependent electrical conductivity of elements of the medium,
   $\sigma_0$—electric conductivity of elements of the medium,
   $\eta$—a coefficient of induced polarization, and
   $\tau$—a time decay constant of the induced polarization;
   according to the relationship $$\nabla \times \nabla \times E(i\omega) = i\omega\mu \cdot \sigma(i\omega\sigma_0\eta\tau) \cdot E(i\omega)$$

where
   $\nabla \times$ represents operator curl (or rotor);
   $E(i\omega)$ represents the electric field of a dipole source, expressed in the equation in frequency domain,
   $\mu$ represents magnetic permeability, 2. The method as in claim 1, further comprising:
   arranging four electrodes ($M_1, M_2, M_3, M_4$) as the receiver electrodes in a rectangular pattern to create a substantially horizontal measurement plane, and a fifth electrode (N) approximately in a center of the rectangle to create the receiver.

3. The method as in claim 2, further comprising locating a measuring device between at least two electrodes in the measurement plane to provide for measuring the first and second differences of the electric potential.

4. The method as in claim 2, wherein passing rectangular current impulses comprises including pauses between each of the impulses.

5. The method as in claim 2, wherein setting an equal potential between the four electrodes ($M_1, M_2, M_3, M_4$) provides for substantially eliminating a horizontal current density component, $j_{x,y}$.

6. The method as in claim 2, further comprising moving a dipole current source parallel the measurement profile and placing the source at four different coordinates, $B_1A_1, A_2B_2, A_3B_3$, and $B_4A_4$, to ensure focusing of an electric field at the fifth electrode (N).

7. The method as in claim 6, wherein ensuring focusing comprises estimating a resistivity in the z-direction, $R_z$, according to the relationship:

$$Rz(t_o) = [\Delta UM_1M_3(IB_1A_1,t_o)] :: \{[\Delta^2 UM_1M_2M_3M_4N (BI_1A_1,t_o)] + k_1(t_o) \cdot [\Delta^2 UM_1M_2M_3M_4N (IA_2B_2,t_o)] + + k_2(t_o) \cdot [\Delta^2 UM_1M_2M_3M_4N(IA_3B_3, t_o)] + k_3(t_o) \cdot [\Delta^2 UM_1M_2M_3M_4N(IB_4A_4,t_o)]\};$$

where
   $t_0$ represents a time measurement in the end of a current impulse when the transient electric field is an established value;
   $k_1(t_o), k_2(t_o), k_3(t_o)$ represent focusing coefficients for geometric sounding;
   $\Delta U$ represents a difference in electric potential;
   $\Delta^2 U$ represents the second difference of the electric potential;
   $B_1A_1, A_2B_2, A_3B_3, B_4A_4$ represent the coordinates of the moving dipole current source; and
   I represents current.

8. The method as in claim 7, wherein ensuring focusing comprises estimating focusing coefficients, $k_1(t_o), k_2(t_o), k_3(t_o)$ by simultaneously solving the following system of linear equations:

a. $\{[\Delta UM_1M_2(IB_1A_1,t_o)]+k_1(t_o)\cdot[\Delta UM_1M_2(IA_2B_2,t_o)]+k_2(t_o)\cdot[\Delta UM_1M_2(IA_3B_3,t_o)]+k_3(t_o)\cdot[\Delta UM_1M_2(IB_4A_4,t_o)]=0\};$ b. $\{[\Delta UM_1M_3(IB_1A_1,t_o)]+k_1(t_o)\cdot[\Delta UM_1M_3(IA_2B_2,t_o)]+k_2(t_o)\cdot[\Delta UM_1M_3(IA_3B_3,t_o)]+k3(t_o)\cdot[\Delta UM_1M_3(IB_4A_4,t_o)]=0\};$ and c. $\{[\Delta UM_1M_4(IB_1A_1,t_o)]+k_1(t_o)\cdot[\Delta UM1M4(IA_2B_2,t_o)]+k_2(t_o)\cdot[\Delta UM_1M_4(IA_3B_3,t_o)]+k_3(t_o)\cdot[\Delta UM_1M_4(IB_4A_4,t_o)]=0\};$ where $t_0$ represents a time measurement at the end of a current impulse when the transient electric field is an established value;

$\Delta U$ represents a difference in electric potential;

$\Delta^2 U$ represents the second difference of the electric potential;

$B_1A_1, A_2B_2, A_3B_3, B_4A_4$ represent coordinates of the moving dipole current source; and I represents current.

9. The method as in claim 7, wherein ensuring focusing comprises estimating focusing coefficients, $k_1(t_i)$, $k_2(t_i)$, $k_3(t_i)$ by simultaneously solving the following system of linear equations:

a. $\{[\Delta UM_1M_2(IB_1A_1,t_i)]+k_1(t_i)\cdot[\Delta UM_1M_2(IA_2B_2,t_i)]+k_2(t_i)\cdot[\Delta UM_1M_2(IA_3B_3,t_i)]+k_3(t_i)\cdot[\Delta UM_1M_2(IB_4A_4,t_i)]=0\};$ b. $\{[\Delta UM_1M_3(IB_1A_1,t_i)]+k_1(t_i)\cdot[\Delta UM_1M_3(IA_2B_2,t_i)]+k_2(t_i)\cdot[\Delta UM_1M_3(IA_3B_3,t_i)]+k3(t_i)\cdot[\Delta UM_1M_3(IB_4A_4,t_i)]=0\};$ and c. $\{[\Delta UM_1M_4(IB_1A_1,t_i)]+k_1(t_i)\cdot[\Delta UM1M4(IA_2B_2,t_i)]+k_2(t_i)\cdot[\Delta UM_1M_4(IA_3B_3,t_i)]+k_3(t_i)\cdot[\Delta UM_1M_4(IB_4A_4,t_i)]=0\};$ where $t_i$, represents time measurements between current impulses (i=1, ..., N);

$\Delta U$ represents a difference in electric potential;

$\Delta^2 U$ represents the second difference of the electric potential;

$B_1A_1, A_2B_2, A_3B_3, B_4A_4$ represent coordinates of the moving dipole current source; and I represents current.

10. The method as in claim 6, wherein ensuring focusing comprises estimating a resistivity in the z-direction, $R_z$, according to the relationship:

$Rz(t_i)=[\Delta UM_1M_3(IB_1A_1,t_i)]::\{[\Delta^2 UM_1M_2M_3M_4N(BI_1A_1,t_i)]+k_1(t_i)\cdot[\Delta^2 UM_1M_2M_3M_4N(IA_2B_2,t_i)]++k_2(t_i)\cdot[\Delta^2 UM_1M_2M_3M_4N(IA_3B_3,t_i)]+k_3(t_i)\cdot[\Delta^2 UM_1M_2M_3M_4N(IB_4A_4,t_i)]\};$ where $t_i$, represents times measurement between current impulses (i=1, ..., N);

$k_1(t_i)$, $k_2(t_i)$, $k_3(t_i)$ represent focusing coefficients for transient sounding;

$\Delta U$ represents a difference in electric potential;

$\Delta^2 U$ represents the second difference of the electric potential;

$B_1A_1, A_2B_2, A_3B_3, B_4A_4$ represent coordinates of the moving dipole current source; and I represents current.

11. An apparatus adapted for providing an estimate of at least one geophysical property in a conductive medium, the apparatus comprising:

a plurality of electrodes adapted for being distributed in the medium, the electrodes further adapted for being coupled to a power source for periodically passing rectangular current impulses through the electrodes and into the media;

a receiver for collecting a sequence of sounding data between each of the impulses; and a processor for receiving the sounding data and simultaneously determining at least a first difference and a second difference of the electric potential between points of the collected data and providing at least one orthogonally weighted measurement and at least one axially weighted measurement of the sounding data for deriving a focused measurement, and using the focused measurement to estimate at least one of the following geophysical properties of the conductive media:

$\sigma(i\omega\sigma_0\eta\tau)$, which represents frequency-dependent electrical conductivity of elements of the medium, $\sigma_0$, which represents electric conductivity of elements of the medium, $\eta$, which represents a coefficient of induced polarization, and $\tau$, which represents a time decay constant of the induced polarization;

according to the relationship $\nabla\times\nabla\times E(i\omega)=i\omega\mu\cdot\sigma(i\omega\sigma_0\eta\tau)\cdot E(i\omega);$ where $\nabla\times$ represents operator curl (or rotor);

$E(i\omega)$ represents the electric field of a dipole source, expressed in the equation in frequency domain, $\mu$ represents magnetic permeability.

12. The apparatus of claim 11, wherein the plurality of electrodes comprises a plurality of electrodes suited for distribution in one of a rectangular and circular arrangement in the media.

13. The apparatus of claim 11, wherein the receiver comprises a plurality of electrodes.

14. The apparatus of claim 11, wherein the processor is in a remote location.

15. The apparatus of claim 11, wherein the conductive media comprises at least one of sea water and sedimentary rocks.

16. A method for estimating a geophysical property, the method comprising:

periodically passing rectangular current impulses through a conductive media using a plurality of transmitter electrodes distributed therein;

collecting a sequence of sounding data between each of the impulses with a receiver electrode disposed between the plurality and in the media;

when each transmitter electrode is excited, acquiring a focused measurement;

simultaneously calculating a combination of at least one orthogonally weighted measurement and at least one axially weighted measurement from acquired measurements, wherein weighting is obtained from a condition of equipotentiality in electrodes of the receiver; and using results of the calculating to estimate the geophysical property.

17. The method as in claim 16, wherein calculating comprises eliminating an axial component of current density, $j_x$, and an orthogonal component of current density, jy.

18. The method as in claim 16, wherein the property comprises at least one of:

electric conductivity, $\sigma_0$, induced polarization, $\eta$, and time decay constant of the induced polarization, $\tau$.

19. The method as in claim 16, wherein a distance between the electrodes is between 200 meters and 1,000 meters.

* * * * *